United States Patent
Dunsch et al.

(10) Patent No.: US 10,245,536 B2
(45) Date of Patent: Apr. 2, 2019

(54) FILTER HEAD AND THREADED METAL NOZZLE INSERT

(71) Applicant: Mahle International GmbH, Stuttgart (DE)

(72) Inventors: Robert Dunsch, Vaihingen (DE); Lutz Haala, Obersulm (DE)

(73) Assignee: Mahle International GmbH (DE)

( * ) Notice: Subject to any disclaimer, the term of this patent is extended or adjusted under 35 U.S.C. 154(b) by 115 days.

(21) Appl. No.: 15/128,962

(22) PCT Filed: Feb. 25, 2015

(86) PCT No.: PCT/EP2015/053940
§ 371 (c)(1),
(2) Date: Sep. 23, 2016

(87) PCT Pub. No.: WO2015/144378
PCT Pub. Date: Oct. 1, 2015

(65) Prior Publication Data
US 2017/0106316 A1  Apr. 20, 2017

(30) Foreign Application Priority Data

Mar. 24, 2014 (DE) .................. 10 2014 205 449

(51) Int. Cl.
*B01D 35/30* (2006.01)
*B01D 35/00* (2006.01)
*F01M 11/03* (2006.01)

(52) U.S. Cl.
CPC ......... *B01D 35/306* (2013.01); *B01D 35/005* (2013.01); *B01D 35/30* (2013.01);
(Continued)

(58) Field of Classification Search
CPC ............... B01D 35/306; B01D 35/005; B01D 2201/4023; F01M 2011/031; F01M 11/03
(Continued)

(56) References Cited

U.S. PATENT DOCUMENTS

| | | | |
|---|---|---|---|
| 5,285,347 A | 2/1994 | Fox et al. | |
| 2009/0114652 A1* | 5/2009 | Nilsen | F01M 11/04 220/288 |

FOREIGN PATENT DOCUMENTS

| | | |
|---|---|---|
| DE | 853463 C | 10/1952 |
| DE | 4223647 A1 | 1/1994 |

(Continued)

OTHER PUBLICATIONS

English abstract for EP-2233189.
(Continued)

*Primary Examiner* — Madeline Gonzalez
(74) *Attorney, Agent, or Firm* — Fishman Stewart PLLC

(57) ABSTRACT

A filter head may include a receiving component and a threaded metal nozzle insert at least partly injected into the receiving component. The receiving component and/or the filter head may be composed of plastic. The threaded metal nozzle insert may be structured as a cold extruded part. A plurality of radially extending ribs may be disposed in a cavity of the receiving component and/or the filter head. The ribs may be composed of plastic and/or integrally formed with the filter head. The ribs may extend along a radial direction from the threaded nozzle insert to a wall of the cavity. The ribs may additionally lead radially outward into an axial sealing surface of the filter head.

20 Claims, 1 Drawing Sheet

(52) U.S. Cl.
CPC ...... *B01D 2201/4023* (2013.01); *F01M 11/03* (2013.01); *F01M 2011/031* (2013.01)

(58) Field of Classification Search
USPC .................................. 210/440–446, 453, 454
See application file for complete search history.

(56) References Cited

FOREIGN PATENT DOCUMENTS

| | | |
|---|---|---|
| DE | 19536613 C1 | 11/1996 |
| DE | 19632053 C2 | 10/2000 |
| DE | 69701265 T2 | 10/2000 |
| DE | 102005045608 A1 | 3/2007 |
| DE | 102010062647 A1 | 6/2012 |
| DE | 102012000876 B3 | 3/2013 |
| EP | 0925816 A1 | 6/1999 |
| EP | 2233189 A1 | 9/2010 |
| EP | 2368615 A1 | 9/2011 |
| WO | WO-2012/168639 A1 | 12/2012 |

OTHER PUBLICATIONS

English abstract for DE-102012000876.
English abstract for DE-19536613.
English abstract for EP-2368615.
International Search Report dated Dec. 11, 2015 related to corresponding International Patent Application No. PCT/EP2015/070709.
German Search Report dated May 22, 2015 related to corresponding German Patent Application No. 10 2014 221 143.3.

\* cited by examiner

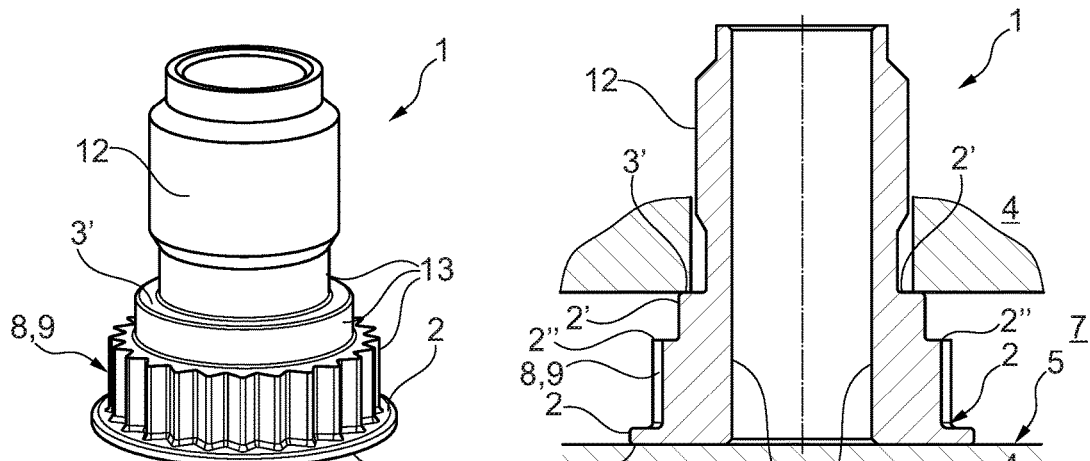
Fig. 1
Fig. 2
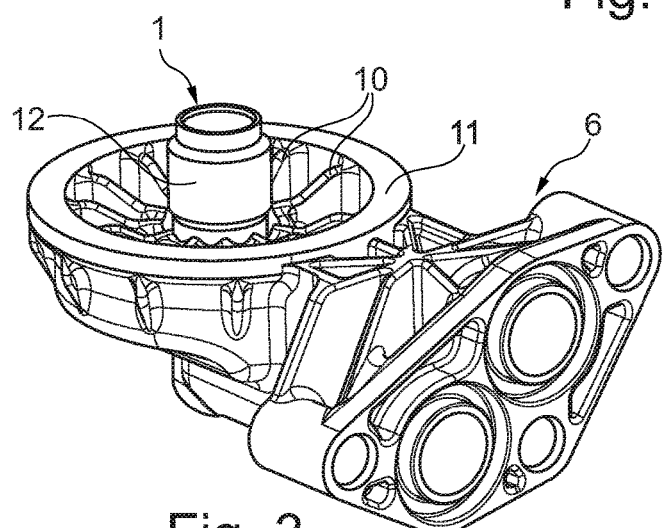
Fig. 3
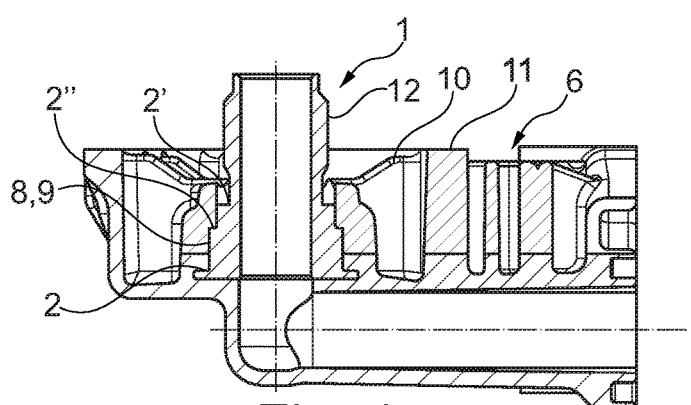
Fig. 4

FILTER HEAD AND THREADED METAL NOZZLE INSERT

CROSS-REFERENCE TO RELATED APPLICATIONS

This application claims priority to German Patent Application No. 10 2014 205 449.4, filed Mar. 24, 2014, and International Patent Application No. PCT/EP2015/053940, filed Feb. 25, 2015, both of which are hereby incorporated by reference in their entirety.

TECHNICAL FIELD

The present invention relates to a filter head made of plastic, comprising a threaded nozzle insert which is at least partly injected into the filter head. The invention also relates to a threaded metal nozzle insert.

BACKGROUND

WO 2012/168639 A1 discloses a filter head which is of the type in question, is made of plastic and has a threaded metal nozzle insert cast therein. In order to be able to absorb the forces required for the sealing, the threaded nozzle insert has radial arms which lead into a ring and, via the latter, the threaded nozzle insert are sealed in relation to the filter head formed from plastic.

In the case of what are referred to as spin-on filters, a receiving component or fastening component (filter head) having the respective supply and removal channels is provided in the motor vehicle. Said filter head is customarily manufactured from metal since manufacturing same from plastic exhibits stability problems caused, for example, by what is referred to as the creepage of the plastic. Should filter heads accordingly be formed from plastic, a comparatively complicated and expensive threaded metal nozzle insert has to be pressed into the plastic. Said insert furthermore has to be sealed in a complicated manner and makes the entire filter head more expensive. Solutions are also known from the fuel filter sphere, in which threaded metal nozzle inserts are used in the form of a turned part with little tolerance, wherein although such turned threaded nozzle inserts are comparatively expensive, they can be sealed as standard in a simple manner radially/radially in relation to the plastics injection molding die.

SUMMARY

The present invention is concerned with the problem of specifying, for a filter head of the type in question, an improved or at least an alternative embodiment which is in particular more cost-effective and is less prone to creepage.

This problem is solved according to the invention by the subject matter of the independent claim(s). Advantageous embodiments are the subject matter of the dependent claims.

The present invention is based on the general concept of providing a filter head made of plastic with a threaded metal nozzle insert formed as a cold extruded part. The filter head here has radially running plastic ribs which extend from the threaded nozzle insert in a radial manner. The plastic ribs run here in the radial direction from the inside from the threaded nozzle insert outward to an axial sealing surface and open into the latter or merge in an aligned manner into the latter. The plastic ribs and the sealing surface are formed integrally on the filter head here, that is to say are made of plastic. By means of the comparatively raised plastic ribs which are guided as far as the axial sealing surface, said plastic ribs have significantly increased rigidity in comparison to plastic ribs hitherto ending significantly below the sealing surface. By this means, creepage which impairs the sealing effect can be considerably reduced. In addition, the threaded nozzle insert produced as a cold extruded part can be produced cost-effectively. Furthermore, the plastic ribs ensure that the forces of the mounted filter cartridge, the what is referred to as spin-on, which forces have to be absorbed so that the axial seal seals, can be optimally removed with respect to the threaded nozzle insert.

In an advantageous development of the filter head according to the invention, the plastic ribs merge in a manner aligned radially on the outside into the axial sealing surface. A particularly high and therefore stiff cross-sectional profile of the plastic ribs can thereby be created, as a result of which the creepage can be significantly reduced.

The threaded nozzle insert according to the invention is first of all placed here into an injection mold and is subsequently insert molded with the plastic of the filter head. By means of the at least one radial shoulder of the threaded nozzle insert, said radial shoulder being provided for the first time according to the invention, the threaded nozzle insert is pressed with its axial sealing surface onto the wall of the plastics injection molding die during the injection of the plastic into the plastics injection molding die, as a result of which significantly improved sealing can be obtained than was possible at all in the case of seals hitherto effective only radially. Furthermore, it is of particular advantage here that, because of the improved sealing effect of the threaded nozzle insert according to the invention in the plastics injection molding die, greater tolerance can be accepted for the manufacturing accuracy of the threaded nozzle insert, which was unacceptable in the case of previous threaded nozzle inserts providing only a radial seal in the plastics injection molding die.

The present invention is furthermore based on the general concept of designing a threaded metal nozzle insert for the at least partial casting into a filter head made of plastic for the first time as a cost-effective cold extruded part with at least one radial shoulder with an axial sealing surface. By means of this radial shoulder, the threaded nozzle insert placed into a plastics injection molding die is pressed against the wall of the plastics injection molding die and is sealed here in relation to the plastics injection molding die via the axial sealing surface on the radial shoulder. By means of the threaded nozzle insert according to the invention, it is therefore possible for the first time to provide a threaded nozzle insert previously sealed only radially/radially now for the first time with an axial sealing surface on the radial shoulder and, as a result, to provide a seal in the axial direction in relation to the plastics injection molding die solely by means of the pressure of the injected plastic. By the threaded nozzle insert according to the invention being pressed via its radial shoulder against the wall of the plastics injection molding die, it is possible for the first time also to use a threaded nozzle insert having greater tolerances in a plastics injection molding die and therefore to dispense with the threaded nozzle inserts which were hitherto comparatively expensive since they were turned. By means of the axial sealing surface on the radial shoulder, it is also possible for the first time to design the threaded nozzle insert as a cold extruded part and therefore to produce same comparatively cost-effectively. In comparison to the threaded metal nozzle insert known from WO 2012/168639 A1, the threaded nozzle insert according to the invention is also significantly lighter, which is of great advantage in particular in motor vehicle manufacturing.

The threaded nozzle insert expediently has a means for securing against rotation, in particular a knurled portion on an outer lateral surface. In order to be able to screw a filter element, in particular a ring filter element, onto the threaded nozzle insert, the latter has to be able to apply a corresponding counter torque, which is ensured by the means according to the invention for securing against rotation. Said means for securing against rotation changes the originally cylindrical and therefore circular outer contour of the threaded nozzle insert into a non-circular outer contour, for example by means of radial projections, and therefore enables the threaded nozzle insert to interlock with the plastic. By means of the means for securing against rotation which is provided according to the invention, the threaded nozzle insert can be secured particularly reliably and firmly in the filter head injection molded from plastic.

Further important features and advantages of the invention emerge from the dependent claims, from the drawings and from the associated description of the figures with reference to the drawings.

It goes without saying that the features mentioned above and those which have yet to be explained below are usable not only in the respectively stated combination, but also in different combinations or on their own without departing from the scope of the present invention.

BRIEF DESCRIPTION OF THE DRAWINGS

Preferred exemplary embodiments of the invention are illustrated in the drawings and are explained in more detail in the description below, wherein identical reference numbers refer to identical or similar or functionally identical components.

In the drawings, in each case schematically:

FIG. 1 shows a view of a threaded nozzle insert according to the invention,

FIG. 2 shows a sectional illustration through the threaded nozzle insert,

FIG. 3 shows a threaded nozzle insert cast into a filter head according to the invention, FIG. 4 shows a sectional illustration through the filter head illustrated according to FIG. 3.

DETAILED DESCRIPTION

According to FIGS. 1 and 2, a threaded metal nozzle insert 1 according to the invention has at least one radial shoulder 2 with an axial sealing surface 3. Via said axial sealing surface 3, the threaded nozzle insert 1 can be sealed in a plastics injection molding die 4 (cf. FIG. 2) in relation to a wall 5 of the injection molding die 4. Likewise arranged in the same manner on the opposite side is a radial shoulder 2' with an axial sealing surface 3' which likewise permits sealing in relation to the plastics injection molding die 4 in a purely axial direction.

In contrast to previous threaded nozzle inserts known from the prior art, it is possible with the threaded nozzle insert 1 according to the invention for the first time to seal the latter in the axial direction in relation to the plastics injection molding die 4, in particular via its radial shoulder 2 with its axial sealing surface 3. The plastics injection molding die 4 serves here to produce a filter head 6 (in a similar manner as in FIGS. 3 and 4) from plastic, into which the threaded nozzle insert 1 is cast. When the plastic is injected into a cavity 7 of the plastics injection molding die 4, the plastic injected under pressure causes the threaded nozzle insert 1 to be pressed via its radial shoulder 2 with its axial sealing surface 3 against the wall 5 of the injection molding die 4 and thereby be sealed. By means of the provision of at least one radial shoulder 2 and the axial sealing surface 3 which is effective therewith, it is possible for the first time to produce the threaded nozzle insert 1 as a cold extruded part and therefore to produce same comparatively cost-effectively. Threaded nozzle inserts have previously only been sealed radially, which required an only small tolerance, i.e. high manufacturing accuracy of the threaded nozzle insert 1. By means of the axial sealing now achieved for the first time, greater tolerances and therefore greater manufacturing inaccuracies of the threaded nozzle insert 1 according to the invention can be accepted, and therefore the latter can be designed as a cost-effective cold extruded part.

Looking further at FIGS. 1 and 2, it can be seen that the threaded nozzle insert 1 has a means for securing against rotation 8, in particular a knurled portion 9 on an outer lateral surface. Via said knurled portion 9, which is surrounded by the plastic in the plastics injection molding die 4, the threaded nozzle insert 1 interlocks in the plastic of the filter head 6 and therefore said threaded nozzle insert is anchored non-rotatably in the filter head 6.

Looking further at FIG. 2, it can be seen that the threaded nozzle insert 1 according to the invention has a total of three radially stepped radial shoulders 2, 2' and 2", wherein the means for securing against rotation 8 is arranged between the radial step 2 and the radial step 2".

FIGS. 3 and 4 show a filter head 6 according to the invention which is injection molded in a plastics injection molding die and has radially running plastic ribs 10 which extend from the threaded nozzle insert 1 in a radial manner. They lead on the outside into an axial sealing surface 11 which is pressed in a sealing manner against a filter element (not shown). The plastic ribs 10 serve as reinforcing ribs and prevent or reduce at least a creepage of the plastic during the operation of a filter device equipped with a filter head 6 of this type, for example an oil filter. The ring filter element can be screwed on via an external thread 12 arranged on the threaded nozzle insert 1.

The plastic ribs 10 preferably run here not only in the radial direction from the inside of the threaded nozzle insert 1 outwards to the axial sealing surface 11 and lead into the latter, but rather even merge in an aligned manner into the latter. This creates a particularly high and therefore stiff cross-sectional profile of the plastic ribs 10, as a result of which the creepage can be significantly reduced.

The plastic ribs 10 and the sealing surface 11 are formed integrally here on the filter head, i.e. in one piece therewith from plastic. By means of the comparatively raised plastic ribs 10 which are guided as far as the axial sealing surface 11, said plastic ribs therefore have a significantly increased rigidity in comparison to plastic ribs previously ending significantly below the sealing surface 11. By this means, the creepage impairing the sealing effect can be considerably reduced. The plastic ribs 10 furthermore ensure that the forces of the mounted filter cartridge, the what is referred to as spin-on, which forces have to be applied so that the axial seal seals, can be optimally removed with respect to the threaded nozzle insert 1.

With the threaded nozzle insert 1 according to the invention, it is possible for the first time to seal the latter axially in relation to the plastics injection molding die 4, as a result of which higher tolerances can be accepted than in the case of purely radial sealing, as a result of which it is possible in turn to form the threaded nozzle insert 1 as a metal cold extruded part and therefore to form same cost-effectively. In particular, the use of turned and comparatively expensive threaded nozzle inserts can thereby also be avoided.

Of course, it is clear here that, in addition to the axial sealing surfaces 3, 3', radial sealing surfaces 13 are also provided. Said radial sealing surfaces 13 make it possible, together with the axial sealing surfaces 3, 3', to seal the threaded nozzle insert 1 axially and radially and to insert mold same with greater accuracy.

The radial sealing surfaces may be located here in the interior of the threaded nozzle 1, but at the same time also in the region of the means for securing against rotation 8 or the knurled portion 9. A radial sealing surface 13 is also provided on the outer lateral surface of the threaded nozzle insert 1 between the means for securing against rotation 8 and the axial sealing surface 3' or between the axial sealing surface 3' and the external thread 12.

The invention claimed is:

1. A filter head, comprising:
a plastic injection molded receiving component having a receiving cavity and a threaded metal nozzle insert disposed in the receiving cavity and at least partly injected into the plastic injection molded receiving component;
the threaded metal nozzle insert defining an axis and structured as a cold extruded part;
the plastic injection molded receiving component defining an axial sealing surface surrounding an opening into the receiving cavity circumferentially to the axis and including a plurality of integral plastic ribs disposed radially to the threaded metal nozzle insert in the receiving cavity, the plurality of integral plastic ribs extending from the threaded nozzle insert along a radial direction of the axis and leading radially outward into the axial sealing surface of the plastic injection molded receiving component; and
wherein the plurality of integral plastic ribs are axially raised at a respective radially outward portion leading into the axial sealing surface of the plastic injection molded receiving component relative to a respective radially inward portion of the plurality of integral plastic ribs disposed at the threaded nozzle insert.

2. The filter head as claimed in claim 1, wherein the respective radially outward portion of the plurality of integral plastic ribs merge radially outwards in an axially aligned transition into the axial sealing surface of the plastic injection molded receiving component.

3. The filter head as claimed in claim 1, wherein the plurality of integral plastic ribs slope in an axial direction from the respective radially outward portion at the axial sealing surface of the plastic injection molded receiving component toward the respective radially inward portion at the threaded nozzle insert.

4. A threaded metal nozzle insert for the at least partial casting into a plastic filter head, comprising:
a cold extruded hollow part having a longitudinal axis;
a plurality of radially stepped radial shoulders including a first radially stepped radial shoulder, a second radially stepped radial shoulder, and a third radially stepped radial shoulder;
the first radially stepped radial shoulder having a first axial sealing surface facing a first axial direction, the first radially stepped radial shoulder extending radially outwardly from the cold extruded hollow part;
the second radially stepped radial shoulder extending radially outwardly from the cold extruded hollow part and having an annular surface extending continuously in a circumferential direction of the longitudinal axis that faces a second axial direction opposite the first axial direction;
the third radially stepped radial shoulder extending radially outwardly from the cold extruded hollow part and having a second axial sealing surface facing the second axial direction;
an anti-rotation mechanism disposed on an outer lateral surface of the cold extruded hollow part axially between the first axial sealing surface of the first radially stepped radial shoulder and the annular surface of the second radially stepped radial shoulder; and
wherein the second radially stepped radial shoulder is disposed axially between the first radially stepped radial shoulder and the third radially stepped radial shoulder.

5. The threaded nozzle insert as claimed in claim 4, wherein each of the first axial sealing surface and the second axial sealing surface extend continuously in the circumferential direction of the longitudinal axis along the first radially stepped radial shoulder and the third radially stepped radial shoulder, respectively.

6. The threaded nozzle insert as claimed in claim 4, wherein the plurality of radially stepped radial shoulders each define a radial extent dissimilar from one another such that the first radially stepped radial shoulder extends radially outwardly to a first radial distance greater than a second radial distance defined by the second radially stepped radial shoulder, and the second radial distance defined by the second radially stepped radial shoulder is greater than a third radial distance defined by the third radially stepped radial shoulder.

7. The threaded nozzle insert as claimed in claim 4, wherein the anti-rotation mechanism includes a knurled portion.

8. The threaded nozzle insert as claimed in claim 7, further comprising an external thread disposed on the outer lateral surface of the cold extruded hollow part and spaced axially from the knurled portion.

9. The threaded nozzle insert as claimed in claim 7, wherein the knurled portion includes radial projections structured and arranged to extend axially along the second radially stepped radial shoulder.

10. The filter head as claimed in claim 1, wherein the threaded nozzle insert includes at least one radially stepped radial shoulder extending radially outwardly from an outer lateral surface, the at least one radially stepped radial shoulder defining a further axial sealing surface for sealingly engaging the receiving cavity of the plastic injection molded receiving component, wherein the at least one radially stepped radial shoulder is embedded in a plastic material of the plastic injection molded receiving component such that the at least one radially stepped radial shoulder is secured on both axial sides by the plastic material.

11. The filter head as claimed in claim 1, wherein the threaded nozzle insert includes an anti-rotation mechanism disposed on an outer lateral surface to secure against rotation in the plastic injection molded receiving component.

12. The filter head as claimed in claim 11, wherein the threaded nozzle insert further includes a threaded portion arranged axially spaced from the anti-rotation mechanism.

13. The filter head as claimed in claim 1, wherein the threaded nozzle insert includes a plurality of radially stepped shoulders extending radially outward from an outer lateral surface, and wherein at least one radially stepped shoulder of the plurality of radially stepped shoulders defines a further axial sealing surface for sealingly engaging with the plastic injection molded receiving component.

14. The filter head as claimed in claim 13, wherein the threaded nozzle insert further includes a knurled portion disposed on the outer lateral surface, and wherein the knurled portion is arranged between the at least one radially stepped shoulder and another of the plurality of radially stepped shoulders.

15. The filter head as claimed in claim 11, wherein the anti-rotation mechanism includes radial projections that interlock with a plastic material of the plastic injection molded receiving components.

16. A filter head, comprising:
   a plastic injection molded receiving component defining a receiving cavity and having an axial sealing surface at least partially surrounding the receiving cavity;
   a threaded metal nozzle insert arranged in the receiving cavity of the plastic injection molded receiving component, the threaded metal nozzle insert having a cold extruded hollow structure defining a longitudinal axis;
   a plurality of radially extending plastic ribs disposed in the receiving cavity of the plastic injection molded receiving component, wherein the plurality of plastic ribs extend from the threaded nozzle insert along a radial direction towards the axial sealing surface of the plastic injection molded receiving component;
   the threaded metal nozzle insert including at least one radial shoulder extending radially outwardly from the longitudinal axis, the at least one radial shoulder defining a further axial sealing surface sealingly engaged with the receiving cavity of the plastic injection molded receiving component; and
   wherein the threaded nozzle insert further includes an anti-rotation mechanism disposed on an outer lateral surface to secure against rotation in the plastic injection molded receiving component, the anti-rotation mechanism including a plurality of radial projections interlocking with a plastic material of the plastic injection molded receiving component.

17. The filter head as claimed in claim 16, wherein at least one plastic rib of the plurality of plastic ribs is axially raised at a radially outer portion leading into the axial sealing surface of the plastic injection molded receiving component relative to a radially inward portion of the at least one plastic rib disposed at the threaded nozzle insert.

18. The filter head as claimed in claim 17, wherein the axial sealing surface of the plastic injection molded receiving component surrounds an opening into the receiving cavity circumferentially to the longitudinal axis, and wherein the radially outward portion of at least one plastic rib merges radially outwards in an axially aligned transition into the axial sealing surface of the plastic injection molded receiving component.

19. The filter head as claimed in claim 16, wherein the plurality of plastic ribs are integral with the receiving cavity of the plastic injection molded receiving component and define an axial extent that decreases from the axial sealing surface of the plastic injection molded receiving component towards the threaded metal nozzle insert.

20. The filter head as claimed in claim 16, wherein the threaded metal nozzle insert further includes a plurality of radially stepped radial shoulders including the at least one radial shoulder, the plurality of radially stepped radial shoulders further including a first radially stepped radial shoulder extending radially outwardly from the threaded metal nozzle insert and arranged axially further from the axial sealing surface of the plastic injection molded receiving cavity than two other radial shoulders of the plurality of radially stepped radial shoulders, the first radially stepped radial shoulder defining a further axial sealing surface for sealingly engaging the receiving cavity of the plastic injection molded receiving component, wherein the first radially stepped radial shoulder is embedded in a plastic material of the plastic injection molded receiving component such that the first radially stepped radial shoulder is secured on both axial sides by the plastic material.

\* \* \* \* \*